United States Patent [19]
McCartney et al.

[11] 4,201,444
[45] May 6, 1980

[54] SINGLE OPTICAL FIBER CONNECTOR

[75] Inventors: Ronald L. McCartney, Orange; Bruce K. Arnold, El Toro; Vaughn C. Hogan, Sun Valley, all of Calif.

[73] Assignee: International Telephone and Telegraph Corporation, New York, N.Y.

[21] Appl. No.: 877,262

[22] Filed: Feb. 13, 1978

Related U.S. Application Data

[63] Continuation of Ser. No. 680,171, May 26, 1976, abandoned.

[51] Int. Cl.$^2$ .............................................. G02B 5/14
[52] U.S. Cl. .................................................. 350/96.21
[58] Field of Search ........................... 350/96.20–96.22

[56] References Cited

U.S. PATENT DOCUMENTS

| | | | |
|---|---|---|---|
| 3,885,859 | 5/1975 | Dalgleish et al. | 350/96.21 |
| 3,960,531 | 6/1976 | Kohanzadeh | 350/96.21 |
| 3,989,567 | 11/1976 | Tardy | 350/96.21 |
| 4,033,669 | 7/1977 | Hanson | 350/96.20 |
| 4,047,796 | 9/1977 | Kao et al. | 350/96.21 |
| 4,050,781 | 9/1977 | Beauhaire | 350/96.21 |
| 4,050,783 | 9/1977 | Tardy | 350/96.21 |
| 4,088,386 | 5/1978 | Hawk | 350/96.21 |
| 4,088,390 | 5/1978 | McCartney | 350/96.21 |
| 4,093,341 | 6/1978 | Crick | 350/96.20 X |

OTHER PUBLICATIONS

Hawk, R. M., Thiel, F.L., "Low Loss Splicing and Connection of Optical Waveguide Cables," SPIE, vol. 63, Guided Optical Communications, Aug. 1975.
Dworkin, Loryell Dragoo, "The Application of Optical Waveguides to Army Communications," SPIE, vol. 63, Guided Optical Communications, Aug. 1975.

*Primary Examiner*—Rolf G. Hille
*Attorney, Agent, or Firm*—Thomas L. Peterson

[57] ABSTRACT

A connector for coupling a pair of single optical fibers is disclosed. The connector comprises a base plate having a V-groove in its upper surface having a transverse cross-section of an equilateral triangle. Two sets of three equal diameter cylindrical rods lay in the groove each defining an interstitial space therebetween which receives an optical fiber. The sets of rods have mating end faces which abut each other in the groove. A compression plate is mounted over the base plate to arrange the rods in the V-groove so that the centers of the rods are disposed at the vertices of the same equilateral triangle so that the fibers in the interstitial spaces between the rods will become precisely laterally aligned. The groove in the base plate may contain a larger number of rods for aligning a plurality of optical fibers within the interstices defined by the rods. The groove may also have the configuration of a truncated equilateral triangle. A flat cable single optical fiber connector is also disclosed.

46 Claims, 12 Drawing Figures

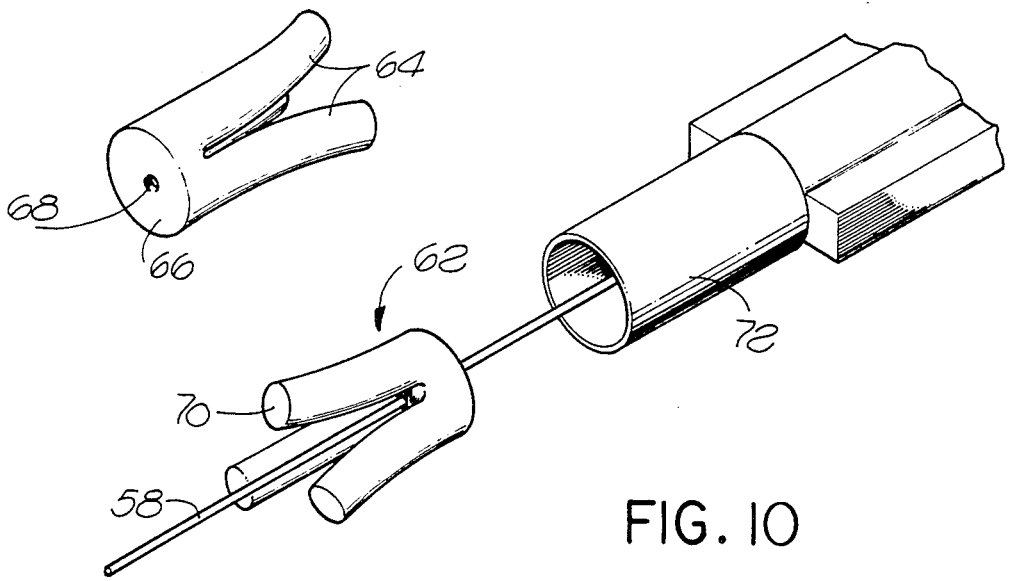
FIG. 9
FIG. 10
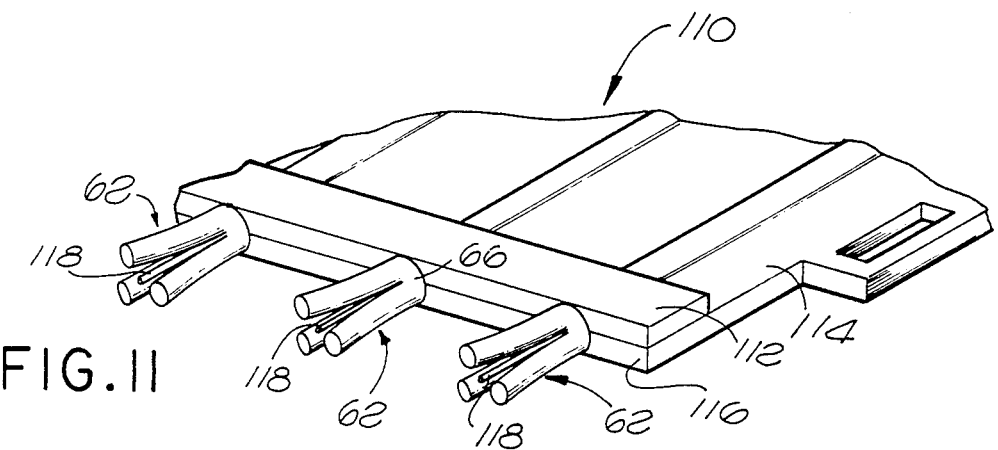
FIG. 11
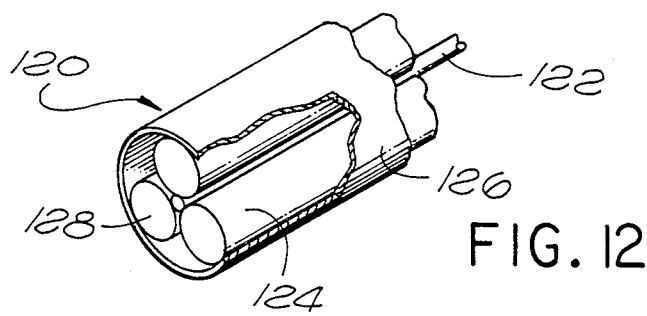
FIG. 12

SINGLE OPTICAL FIBER CONNECTOR

This is a continuation of application Ser. No. 680,171, filed Apr. 26, 1976, now abandoned.

BACKGROUND OF THE INVENTION

The present invention relates generally to a connector and, more specifically, to an optical coupler for single optical fibers.

The employment of fiber optic cables or light guides, also sometimes referred to as optical communication fibers, for the transmission of information-bearing light signals, is now an established art. Much development work has been devoted to the provision of practical low-loss glass materials and production techniques for producing glass fiber cables with protective outer claddings or jackets. The jackets make them resemble ordinary metallic-core electrical cable upon superficial external inspection. Obviously, if fiber optic cables are to be used in practical signal transmission and processing systems, practical connectors for the connection and disconnection of fiber optic cables must be provided.

Some references will now be given for background in the state of fiber optic art in general. An article entitled, "Fiber Optics", by Narinder S. Kapany, published in *Scientific American,* Vol. 203, pgs. 72–81, November 1960, provides a useful background in respect to some theoretical and practical aspects of fiber optic transmission.

Of considerable relevance to the problem of developing practical fiber optic connectors, is the question of transfer efficiency at the connector. Various factors, including separation at the point of abutment, and lateral separation or axial misalignment, are among the factors effecting the light transfer efficiency at a connector. In this connection, attention is directed to the *Bell System Technical Journal,* Vol. 50, No. 10, December 1971, specifically to an article by D. L. Bisbee, entitled, "Measurement of Loss Due to Offset, and End Separations of Optical Fibers". Another *Bell System Technical Journal* article of interest appeared in Vol. 52, No. 8, October 1973, and was entitled, "Effect of Misalignments on Coupling Efficiency on Sing'e-Mode Optical Fiber But Joints", by J. S. Cook, W. L. Mammel and R. J. Grow.

Fiber optic bundles are normally utilized for only short transmission distances in fiber optic communications networks. On the other hand, fibers are used individually as optical data channels to allow transmission over many kilometers. At present, most fiber optic cables are multi-fiber bundles due to the less stringent splicing requirements, greater inherent redundancy, and higher signal-to-noise ratio. The difficulty in achieving connections between single fibers which are sensitive to axial misalignment problems has created an obstacle to the use of long run single data transmission systems.

Therefore, a connector or coupler is required to eliminate lateral tolerances if low-loss connections are to be obtained in the use of single fiber optical transmission arrangements. "V" groove and metal sleeve arrangements have been used to interconnect single fibers. Reference is made to U.S. Pat. No. 3,768,146 which discloses a metal sleeve interconnection for single fibers.

Another known device, as shown in U.S. Pat. No. 3,734,594, utilizes a deformable annular core having pressure plates at the ends. The fiber ends are inserted into the core and an axial force is applied to the plates to deform the core radially, thereby aligning and securing the fibers.

These prior devices, however, do not readily provide sufficient accuracy for joining and aligning small diameter cores of optical fibers. Copending application of Charles K. Kao entitled, "Precision Optical Fiber Connector", Ser. No. 613,390, filed Sept. 15, 1975 now Patent No. 4,047,796, assigned to the assignee of the present application, discloses a single optical fiber connector in which the ends of mating fibers are precisely aligned and coupled together in the interstice between three like contacting cylindrical rods. The rods are mounted along and around the fibers within an adjustable connector assembly. Means is provided for expanding the interstice to insert the fiber ends and for clamping the rods in position around the fibers. Copending application of Charles K. Kao entitled, "Precision Surface Optical Fiber", Ser. No. 629,210, filed Nov. 5, 1975, assigned to the assignee of the present application, discloses an optical fiber in which the plastic cladding thereof is formed with three rounded indentations along its surface and a thin metal ferrule is formed around the cladding at the mating end of the fiber. A pair of such fibers may be aligned in a three rod arrangement of the type mentioned above.

A heremaphroditic connector for coupling a pair of single optical fibers is disclosed in copending application of Ronald L. McCartney entitled, "Single Optical Fiber Connector", Ser. No. 629,004, filed Nov. 5, 1975 abandoned in favor of continuation-in-part application Ser. No. 682,274, filed May 3, 1976, now Patent No. 4,088,390, also assigned to the assignee of the present application. The connector comprises a pair of connector members each containing at least one single optical fiber terminated by a termination pin. The pin includes a metal eyelet crimped about the optical fiber in three places providing three, spaced, curved indentations which centrally position the fiber in the pin. When the connector members are mated, the mating termination pins are positioned so that the indentations therein are generally aligned. Three arcuate cam or spring members are forced into the indentations in the mating termination pins to accurately laterally align the pins and, hence, the optical fibers therein.

The purpose of the present invention is to provide a new separable single fiber connector biased partly upon the three rod coupling approach disclosed in the aforementioned copending applications, and which will provide a controlled accurate alignment of mating optical fibers in a manner which will minimize light transmission losses, which is easily manufactured and assembled, and practical for commercial field use.

SUMMARY OF THE INVENTION

According to the broadest aspect of the present invention, there is provided a fiber optic connector for releasably coupling a pair of single optical fibers. The connector comprises a pair of like sets of at least three, generally parallel rods. The rods of each set have adjacent like-shaped cylindrical surfaces providing at least one tricuspid interstitial space therebetween for receiving an optical fiber. For example, each set of rods may comprise three equal diameter cylindrical rods defining a single interstitial space for receiving one optical fiber. The sets of rods have mating end faces which abut each other when the connector is assembled. Means is provided for exerting a radially inwardly directed compressive force on the abutting sets of rods causing the centers of any three contiguous rods of each set to become disposed at the vertices of an equilateral triangle. Therefore, the rods in the two sets are arranged in identical patterns by the compression means. Hence, the fibers disposed in corresponding interstitial spaces in the two sets of rods will become precisely laterally aligned.

According to a more specific aspect of the present invention, there is provided a fiber optic connector comprising a base plate having a groove in its upper surface. The groove includes a pair of planar sides that intersect below the surface at an angle of 60°. The planar sides extend to the surface. A pair of like sets of equal diameter cylindrical rods lie lengthwise in the groove. Each set of rods has adjacent circumferential surfaces providing at least one interstitial space between the rods for receiving an optical fiber. For example, the V-groove may have a transverse cross-section of an equilateral triangle and each set of rods may comprise three rods defining a single interstitial space for receiving one optical fiber. The sets of rods have mating end faces which abut each other in the groove. A compression plate is mounted over the upper surface of the base plate to cause a radially inwardly directed compressive force to be exerted on the rods, thereby arranging the rods of each set in the groove in identical patterns wherein the centers of any three contiguous rods of each set are disposed at the vertices of an equilateral triangle. Since the rods in the two sets are arranged in identical patterns in the groove, fibers disposed in corresponding interstitial spaces in the two sets of rods will become precisely laterally aligned.

The coupling arrangement of the present invention is particularly suited for application to a multi-channel flat cable single fiber connector, and is also applicable to other multi-channel arrangements as will become more apparent from the following description taken in connection with the accompanying drawings.

BRIEF DESCRIPTION OF THE DRAWINGS

FIG. 9 is a perspective illustration of the optical fiber contact utilized in the flat cables of FIGS. 7 and 8, showning the rear of the contact;

FIG. 10 is a front perspective view of the contact illustrated in FIG. 9, showing how it is mounted on an optical fiber in the flat cable;

FIG. 11 is a fragmentary perspective view of a modified form of the flat cable of the present invention in which the optical fiber contacts are joined to a bandolier; and FIG. 12 is a fragmentary perspective view of a fiber optic cable having three cylindrical alignment rods surrounding the optical fiber of the cable inside the cable jacket, which may be used in the connector of the present invention.

DESCRIPTION OF THE PREFERRED EMBODIMENTS

Figure 1:
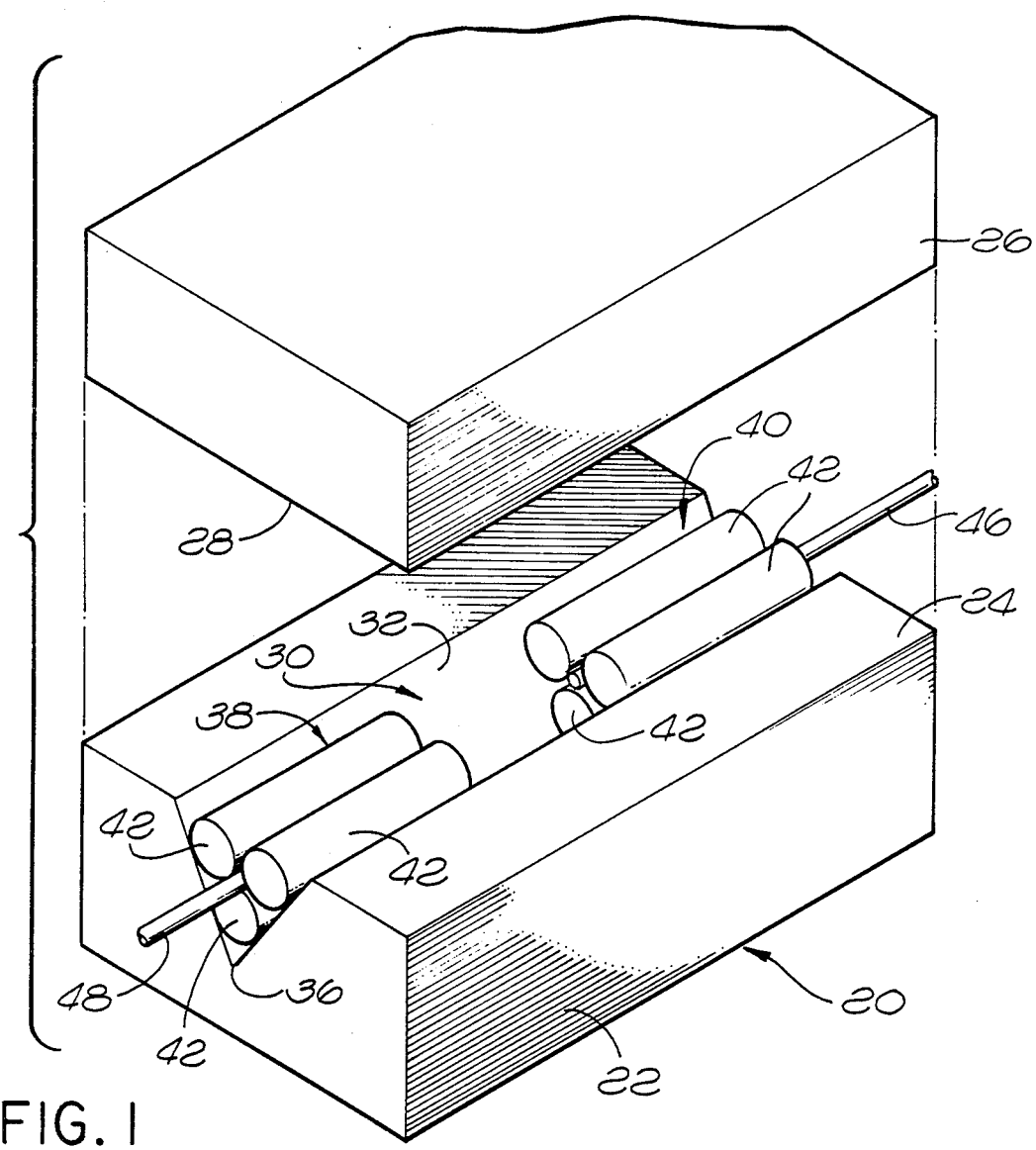
FIG. 1 is a somewhat schematic, perspective illustration of the connector of the present invention in its broadest aspect, with the base and compression plates of the connector shown separated and with two sets of optical fiber alignment rods shown axially spaced in a V-groove in the base plate.
Figure 2:
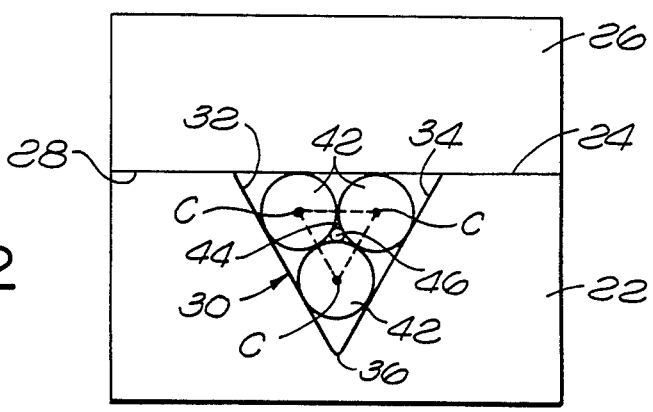
FIG. 2 is an end view of the connector illustrated in FIG. 1 with the compression plate mounted flush on top of the base plate to effect coupling of the two fibers mounted in interstitial spaces of the two sets of rods in the V-groove.

Referring now to FIGS. 1 and 2 of the drawings in detail, there is schematically illustrated the connector of the present invention, generally designated 20, depicted in its simpliest form for the purpose of illustrating the general principals upon which the present invention is based. The connector comprises a base plate 22 having a flat upper surface 24 and a compression plate 26 having a planar lower surface 28. A V-groove 30 is formed in the upper surface 24 of the base plate and extends the length of the plate. The groove has a transverse cross-section of an equilateral triangle so that the planar sides 32 and 34 of the groove intersect at an angle of 60° below the upper surface 24 of the base plate. The sides 32 and 34 of the groove also extend to the surface 24. If desired, the apex 36 of the groove may be slightly rounded to minimize stresses in the base plate.

Two like sets 38 and 40 of equal diameter cylindrical rods 42 lie lengthwise in the V-groove 30. The rods 42 of each set have adjacent circumferential curved surfaces which provide an interstitial space 44 between the rods, as best seen in FIG. 2. An optical fiber 46 is positioned in the interstitial space 44 in the set of rods 40 while a second optical fiber 48 is positioned in the interstitial space 44 in the set of rods 38. The rods of each set are loosely positioned around its respective optical fiber in the groove 30 so that the rods are laterally movable with respect to the fiber. Each set or rods has a planar end face 50 which is perpendicular to the axis of the rods and the fiber. The end faces 50 of the two sets of rods 38 and 40 and shifted into axial abutting relationship with each other in the groove 30 before the compression plate 26 is mounted onto the base plate to couple the fibers 46 and 48 in lateral alignment.

The rods 42 of each set of rods are dimensioned so that each rod engages the other two rods and two planar sides of the equilateral triangular-shaped channel defined by placing the compression plate 26 flush on the upper surface 24 of the base plate, as shown in FIG. 2. Furthermore, the rods 42 are dimensioned so that the interstitial space 44 therebetween is sufficiently large to receive the optical fiber (46 or 48) yet sufficiently small so that the adjacent circumferential surfaces of the rods will engage the fiber at three locations so as to center the fiber between the rods. Assuming that the rods of the two sets 38 and 40 meet the foregoing requirements, and the groove 30 forms a perfect equilateral triangle in transverse cross-section, when the compression plate 26 is mounted flush on top of the base plate 22, the centers C of the rods of each set will be disposed at the vertices of an equilateral triangle T. Since the rods 42 of the two sets of rods 38 and 40 are identical and are positioned in the same V-groove 30, then the centers of the rods of both sets will be disposed at the vertices of the same equilateral tirangle with the result that the optical fibers 46 and 48 in the two sets of rods will become precisely laterally aligned.

Figures 3, 4:
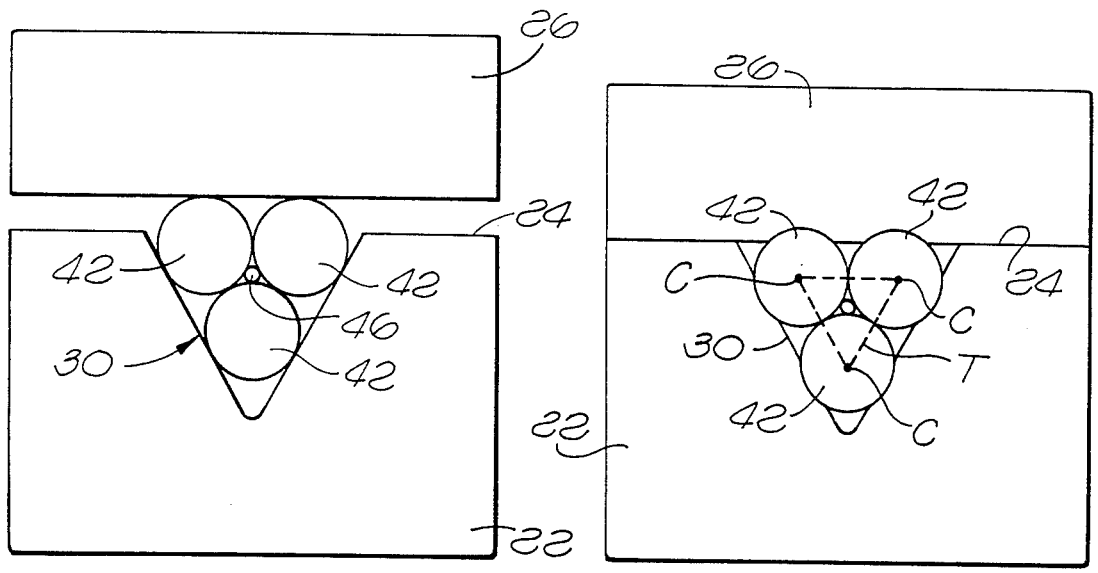
FIG. 3 is a schematic end view illustration of an alternative form of the connector of the present invention in which the base and compression plates are formed of a deformable material and the compression plate is shown resting upon the surfaces of the upper rods which extend above the upper surface of the base plate.
FIG. 4 is an end view similar to FIG. 3 but showing the compression plate flush with the upper surface of the base plate.

If the dimensional relationships discussed above are not maintained, it is possible that if the rods 42 are formed of a rigid material, the optical fibers therebetween may be overstressed. For example, if the fiber is formed of quartz or glass, the fiber may be fractured if the diameter of the rods is too small. Also, if the diameter of the rods is too small, the upper rods will not be engaged by the compression plate 26 so that the rods will be loose in the groove 30 and their centers C may not lie at the vertices of the equilateral triangle T. If the upper surfaces of the upper rods 42 extend above the upper surface 24 of the base plate 22, the compression plate 26 may not be parallel to the upper surface of the base plate to properly arrange the rods. Therefore, in order to construct a connector which is effective for connecting single optical fibers, without precisely maintaining the dimensional relationships discussed above, in accordance with an alternative embodiment of the invention the base plate and compression plate are formed of a slightly deformable material, such as a suitable plastic. Such a connector is illustrated in FIGS. 3 and 4 and reference numerals corresponding to those used in FIGS. 1 and 2 are utilized to designate like parts. In this embodiment, the rods 42 are dimensioned so that upper surfaces of the upper rods in the V-groove extend above the upper surface 24 of the base plate 22. When the compression plate 26 is pushed down flush with the upper surface 24 of the base plate. as seen in FIG. 4, and rods 42 become arranged so that their centers C lie at the vertices of equilateral triangle T, and the sides of the triangular channel formed by the V-groove 30 and compression plate 26 will be slidably deformed. The extent to which the upper rods 42 extend above the upper surface 24 of the base plate 22 in FIG. 3 and the extent to which the rods deform the sides of the triangular shaped channel formed by the assembled connector is exaggerated in FIG. 4 for purposes of illustration. It is important for alignment of the optical fibers in the connector of FIGS. 3 and 4 that there is no gap between the compression plate 26 and base plate 22. Otherwise, the size of the gap for the two sets of rods 38 and 40 may differ on opposite sides of the point of abutment of the mating end faces 50 with the result that lateral alignment of the optical fibers may not be achieved. Therefore, the material of the base plate 22 and compression plate 26 must be sufficiently deformable to assure that the compression plate will lie flush on the upper surface 24 of the base plate when the connector is assembled. It is also preferable that the compression plate and base plate be formed of the same material. Thus, it will be appreciated that alignment of the optical fibers in the connector may be achieved in spite of slight variations in manufacturing tolerances.

In accordance with a further embodiment of the invention, in order to further reduce manufacturing costs and to prevent overstressing of the optical fibers in the connector, the compression rods 42 may also be formed of a slightly deformable material. The rods must all be formed of the same material and have the same diameter. The rods and the base and compression plates may be formed of the same slightly deformable materials or different materials. A preferred material for the rods is nylon. The compression plate and base plate may be formed of silicone rubber or polyprophylene, for example. If the rods are formed of a slightly deformable material, they will not maintain a perfect circular configuration when compressed into the V-groove by the compression plate 26, but rather will take on a slightly triangular configuration. Nevertheless, even with the slight deformation of the rods, base plate, and compression plate, the centers of the three rods of each set of rods will become disposed substantially at the vertices of an identical equilateral triangle so that the optical fibers mounted in the sets of rods will become laterally aligned.

Figures 5, 6:
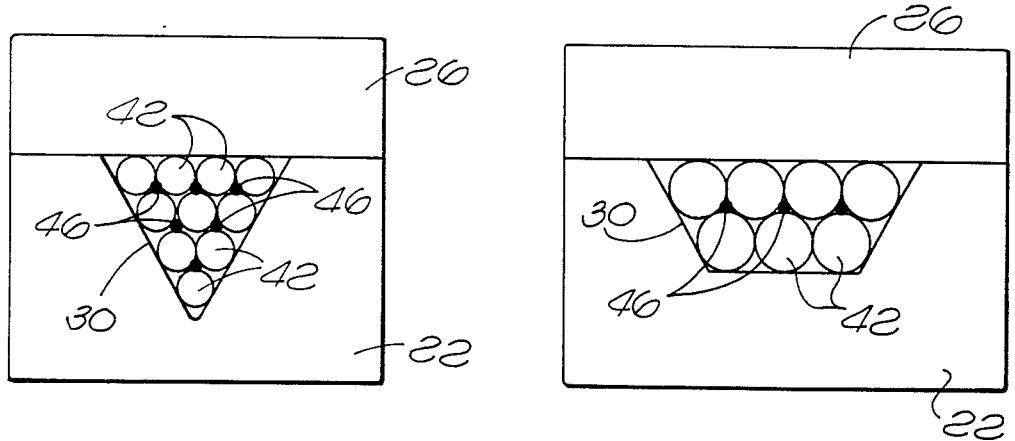
FIG. 5 is a schematic end view of a multi-channel single fiber connector in which the alignment rods of the connector are disposed in a V-shaped groove in the base plate.
FIG. 6 illustrates another form of a multi-channel connector in which the groove in the base plate has a transverse cross-section of a truncated equilateral triangle.
Figures 7, 8:
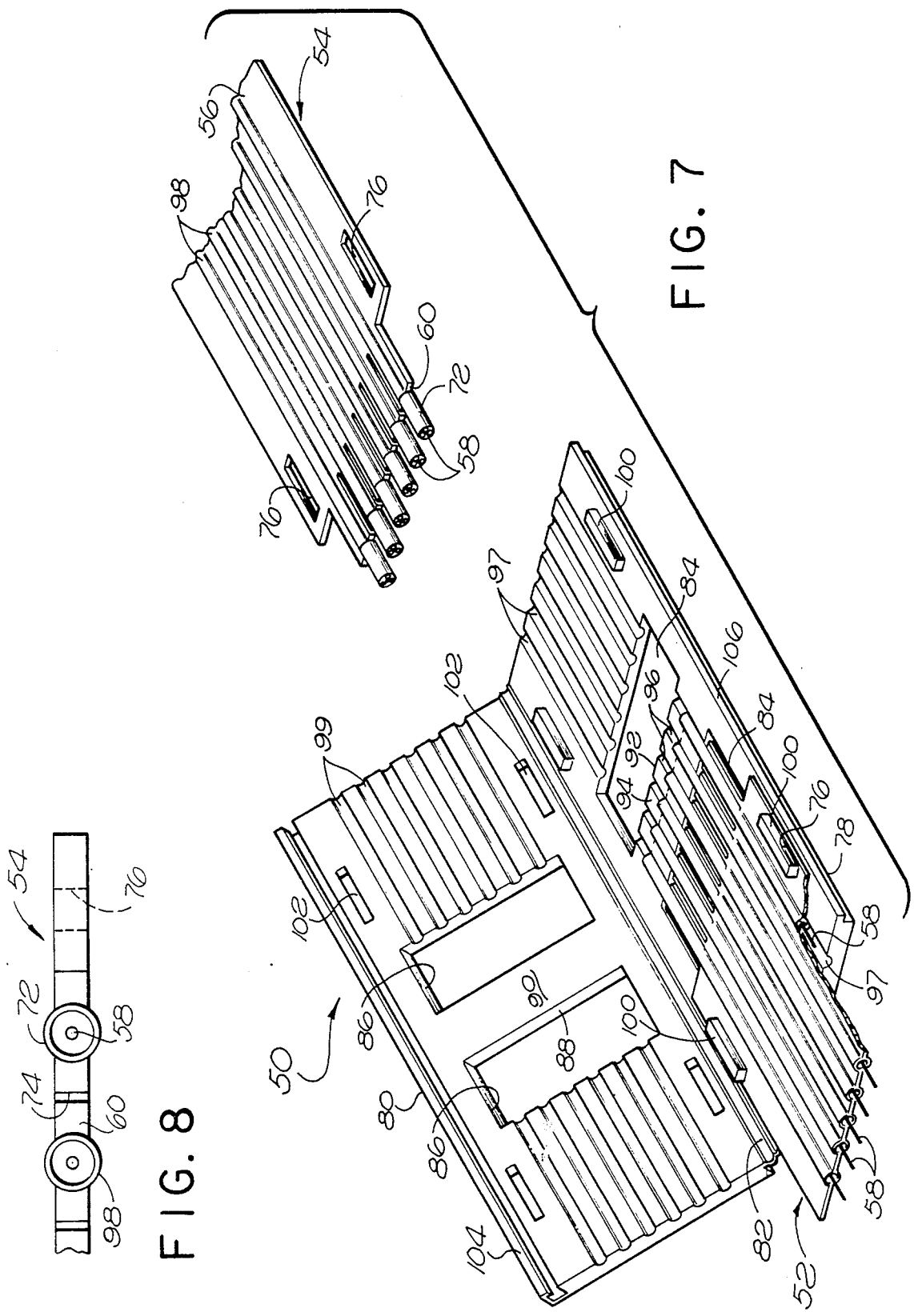
FIG. 7 is a perspective illustration of a single fiber flat cable connector in which the connector is shown in an open position with one flat cable mounted in the connector and a second flat cable mounted outside of the connector.
FIG. 8 is a fragmentary front end view of one of the single fiber flat cables illustrated in FIG. 7.

Reference is now made to FIG. 5 of the drawings which illustrates a multi-channel connector for coupling two sets of six optical fibers. Two sets of equal diameter cylindrical rods 42 are mounted in a V-groove 30, only one set being visible in the FIG. 5. Optical fibers 46 are positioned in the interstitial spaces defined by the adjacent circumferential surfaces of the rods. The rods are dimensioned so that they are arranged in a closely packed array in the groove 30 when the compression plate 26 is mounted flush on the base plate 22. Ten rods are illustrated in FIG. 5 for providing six interstitial spaces for receiving six optical fibers since there is presently a demand for multi-channel connectors for coupling cables having six fibers therein. The number of rods 42 in the groove 30 will differ in accordance with the number of fibers which need be connected. The total number of rods N that will just fit within the triangular groove 30 in a closed packed array is given by the following equation:

$$N = n(n+1)/2$$

where n is an integer greater than 1 and is also the number of rods on a side of the groove. The total number of rods N required for a multi-channel connector is therefore 6, 10, 15, 21, 28, 36, etc. Preferably the alignment rods 42 and plates 22 and 26 are formed of slightly deformable materials for the same reasons discussed above in connection with the description of the embodiment in FIGS. 3 and 4

Reference is now made to FIG. 6 of the drawings which shows a further embodiment of a multi-channel connector for coupling cables having three optical fibers. In this embodiment, the groove 30 in the base plate 22 is in the form of a equilateral triangle and the compression rods 42 are dimensioned so as to be arranged in a closely packed array in the groove to define therebetween three interstitial spaces for receiving the optical fibers 46. Fewer or more rods 42 may be mounted in the groove 30 depending upon the number of optical fibers that is desired to be connected. Thus, it is seen that by the present invention, both single and multi-channel single optical fiber connectors are provided wherein equal diameter cylindrical alignment rods are arranged in a closely packed array in a groove in the upper surface of a base plate, which groove has planar sides that intersect below the surface at an angle of 60° and extend upwardly to the surface. The like-set of rods are arranged in the groove in the base plate in identical patterns by the compression plate so that the centers of any three contiguous rods of each set are disposed at the vertices of the same equilateral triangle whereby the fibers in the corresponding interstitial spaces in the set of rods will become precisely laterally aligned.

Reference is now made to FIGS. 7 to 10 of the drawings which illustrate an optical fiber flat cable connector in accordance with the present invention. The connector, generally designated 50, is shown in an open position with one flat cable 52 mounted in the connector and a second flat cable 54 located out of the connector. The flat cables 52 and 54 are identical. Therefore, the description of the flat cable 54, which will follow, also applies to the cable 52.

The optical fiber flat cable 54 comprises an elongated, flexible insulative member 56, preferably of a suitable plastic, having six optical fibers 58 embedded therein. The fibers extend longitudinally of the elongated member 56 and are in parallel relationship with each other. The fibers extend beyond the end 60 of the flexible member 56. A contact, generally designated 62, is mounted over each of the fibers. The contact can be best seen in FIGS. 9 and 10, and comprises three equal diameter resilient rods 64. The rear ends of the rods are integrally joined to a circular shaped base element 66. In their relaxed condition, the forward portions of the rods are spread outwardly. When the rods are compressed, adjacent circumferential surfaces of the rods define an interstitial space for receiving an optical fiber 58 in the same manner as the rods 42 in the embodiments of the inventions illustrated in FIGS. 1 to 6 of the drawings. An opening 68 is formed in the base element 66 aligned with the interstitial space between the rods. The opening is dimensioned to slidably receive the fiber therethrough. The flat front faces 70 of the three rods 64 lie in a common plane perpendicular to the axis of the fiber when the rods are compressed into engagement with each other with the fiber disposed in the interstitial space therebetween.

Preferably, the flat cable 54 is provided with integral cylindrical flexible sleeves 72 which extend forwardly from the end 60 of the cable. Preferably, the optical fibers 58 initially extend beyond the forward ends of the sleeves 72. To mount a contact 62 over a fiber, the contact is positioned as illustrated in FIG. 10. The fiber is inserted through the opening 68 and the contact is slid rearwardly into the flexible sleeve 72. When the contact is pushed into the sleeve, the forward portions of the rods 64 contract somewhat. The sleeve and rods are dimensioned, however, so that the rods are still slightly spaced apart within the sleeve 72 so that the fiber 58 is loose between the rods. As a consequence, the sleeve and rods are capable of moving radially inwardly to capture the fiber. The end of the fiber 58 is then broken off flush with the flat front faces 70 of the rods and the end of the contact with the fiber therein is then polished to provide a flat mating end face. The contacts 62 in the cable 54 are arranged to that their mating end faces lie in a common plane.

Preferably, an adhesive is applied to the opening 68 in the base element 66 of each contact prior to inserting the contact over its respective fiber to secure the contact on the fiber once it is slid into the sleeve 72. While the flexible sleeves 72 for the contacts are desirable, they are not essential and may be eliminated if the contacts are adequately received to the elongated member 56. It is preferable to provide longitudinally extending slits 74 in the forward end of the elongated member 56 of the flat cable between the fibers 58 to provide independent movement between the fibers and, thus, more effective coupling of the fibers in the cable 54 with the fibers in cable 52. A pair of rectangular openings 76 are provided in the elongated member 56 adjacent to its sides and the forward end 60 for locating the flat cable 54 on the connector 50, as will be explained in detail later.

The connector comprises a base plate 78 and a compression plate 80. A hinge 82 pivotally connects the compression plate 80 to one side of the base plate 78. A pair of spaced, transversely extending rectangular windows 84 are formed in the base plate. Similar windows 86 are formed in the compression plate 80. The windows 86 are aligned with the windows 84 when the compression plate 80 is mounted flush on the upper surface of the base plate. The intermediate area 88 of the compression plate 80 between the windows 86 has a flat smooth lower surface 90. The intermediate area 92 of the base plate between the windows 84 has a flat upper surface 94 with six longitudinally extending V-grooves 96 formed therein. The V-grooves are parallel to each other and spaced apart a distance corresponding to the spacing of the optical fibers 58 in the flat cables 52 and 54. The V-grooves are adapted to receive the flexible sleeves 72 containing the contacts 62 at the ends of the flat cables 52 and 54, which are desired to be coupled together. Parallel, spaced U-grooves 97 are formed in the outer areas of the base plate 98 aligned with the V-groove 96. The U-grooves have a curvature corresponding to the curved longitudinally extending ribs 98 extending from the upper and lower surfaces of the flat cables in the regions of the cable which receive the optical fibers 58. Similar U-shaped grooves 99 are formed in the outer regions of the compression plate 80 and are positioned so as to be aligned with the grooves 97 when the compression plate is mounted on top of the base plate 78.

Four rectangular projections 100 are formed adjacent to the corners of the base plate 78. The projections are dimensioned to slidably fit into the locating openings 76 in the flat cables 52 and 54. Slots 102 are formed in the compression plate 80 which are aligned with the projections 100 when the compression plate is mounted over the base plate and are dimensioned to slidably receive the projections therein.

The projections 100 on the base plate and the openings 76 in the flat cables 52 and 54 are so located that when the flat cables are mounted on the base plate of the connector with the projections passing through the openings 76, the mating end faces of the optical fiber contacts 62 in the two flat cables will be in axial abutting relationship. The contacts will lie in the V-grooves 96 and the curved ribs on the flat cables will lie in the U-grooves 97.

The dimensions and shape of the V-grooves 96 and flexible rods 64 of the fiber contacts 62, and the materials of the rods, base and compression plates, may be the same as that described previously herein with respect to the embodiments illustrated in FIGS. 1 to 4.

With the flat cables 52 and 54 mounted on the base plate, the compression plate 80 is pivoted to a closed position overlying the base plate. The flat smooth lower surface 90 of the intermediate area 88 of the compression plate will press against the flexible sleeves 72 of the respective flat cables 52 and 54, thereby compressing the resilient rods 64 of the contacts 62 of the cables causing the longitudinally aligned corresponding fibers of the two cables to become precisely laterally aligned in the manner previously described herein. Preferably, an integral latch member 104 is formed on the side of the compression plate 80 opposite to the hinge 82. The latch member 104 engages over a longitudinally extending projection 106 on the outer edge of the base plate 78 to releasably retain the compression plate under pressure flush with the upper surface of the base plate. The windows 84 and 86 in the base plate 78 and compression plate 80, respectively, together with the slots 74 in the flat cables 52 and 54, allow some freedom of movement of the optical fibers in the flat cables so that the fibers may become properly laterally aligned when the compression plate 80 is mounted over the base plate.

It can readily be appreciated that by the embodiment of the invention disclosed in FIGS. 7 to 10, there is provided a novel fiber optic flat cable having three rods contacts mounted on the ends of the fibers, and a simple and inexpensive connector which can produce an accurate lateral alignment of the fibers of a pair of flat cables mounted therein. The connector may be inexpensively produced as a one-piece molded part. As will further be appreciated, the connector may be utilized to interconnect a pair of optical flat cables in accordance with the invention with a minimum of skill, thereby facilitating use of the connector in the field by unskilled technicians.

Reference is now made to FIG. 11 of the drawings which illustrates a modified form of an optical flat cable, generally designated 110, which may be utilized in the connector 50. The cable 110 is similar to the flat cable 54 except that the flexible sleeves 72 are eliminated and the fiber contacts 62 are carried by a bandolier 112 which is joined to the insulative body 114 of the cable adjacent to its forward end 116. The optical fibers 118 of the flat cable extend through the openings in the base elements 66 of the contacts 62 into the space between the three rods of each contact. The flat cable 110 would be mounted in the connector 50 in the same manner as either the flat cables 52 or 54.

FIG. 12 illustrates a novel single fiber cable 120 which may be utilized in any of the connectors disclosed herein. The cable 120 comprises an optical fiber 122 having three equal diameter flexible rods 124 mounted therearound in the same manner as the rods 42 or 64. A flexible outer jacket 126 surrounds the rods and fiber. The rods and jacket are preferably of plastic. The rods 124 are loosely extruded around the optical fiber 122 during manufacture and, therefore, run the entire length of the cable 120. The outer jacket 126 may be extruded around the rods 124 in either the same operation or in a separate operation. The fiber 122, rods 124, and jacket 126 terminate in a flat mating end face 128 which is perpendicular to the longitudinal axis of the cable. The rods are slightly loose in the outer jacket 126 so as to be capable of being moved relative to each other and the fiber 122 so that the rods may be properly centered by a suitable compression plate in a V-groove of a connector, such as described previously herein.

What is claimed is:

1. A fiber optic connector for coupling a pair of single optical fibers comprising:

a base plate having a groove in the upper surface thereof, said groove including a pair of planar sides that intersect below said surface at an angle of 60° and extend to said surface;

a pair of like-sets of equal diameter cylindrical rods lying lengthwise in said groove, each said set of rods having adjacent circumferential surfaces providing at least one interstitial space between said rods for receiving an optical fiber;

the region of said groove in which said sets of rods lie being continuous;

all the rods of each said set of rods having front ends lying in a common plane lying transverse to the longitudinal axes of said rods providing a mating end face;

said mating end faces of said sets of rods substantially abutting each other in said groove;

compression plate means mountable over said surface for arranging said rods of each set in said groove in indentical patterns wherein the centers of any three contiguous rods of each set are disposed at the vertices of an equilateral triangle, whereby fibers in corresponding interstitial spaces in said sets of rods will become precisely laterally aligned; and said sets of rods being laterally removably mounted in said groove and being unattached to said compression plate means.

2. A fiber optic connector as set forth in claim 1 wherein:

each said set of rods includes a plurality of upper rods; and the upper surfaces of said upper rods in said groove are at least as high as said upper surface of said plate.

3. A fiber optic connector as set forth in claim 2 wherein:

said upper surfaces of said upper rods extend above said upper surface of said base plate.

4. A fiber optic connector as set forth in claim 2 wherein:

said compression plate means has a planar lower surface extending entirely over said groove and mounted flush on said upper surface of said base plate.

5. A fiber optic connector as set forth in claim 3 wherein:

either said base plate and said compression plate means, or said rods, or both, are of a deformable material; and said compression plate means has a planar lower surface extending entirely over said groove and mounted flush on said upper surface of said base plate.

6. A fiber optic connector as set forth in claim 1 including:

means providing a hinged connection between said base plate and said compression plate means.

7. A fiber optic connector as set forth in claim 1 wherein:

a flexible sleeve surrounds each said set of rods adjacent to said mating end face thereof.

8. A fiber optic connector as set forth in claim 1 wherein:

said rods are formed of the same deformable material; and said base plate and compression plate means are formed of the same deformable material.

9. A fiber optic connector as set forth in claim 1 wherein:

each said set of rods includes a plurality of upper rods;

the upper surfaces of said upper rods in said groove extend above said upper surface of said base plate;

said base plate, said compression plate means and said rods are of a deformable material; and said compression plate means has a planar lower surface extending entirely over said groove and mounted flush on said upper surface of said base plate.

10. A fiber optic connector as set forth in claim 1 wherein:

said groove has a transverse cross-section of an equilateral triangle.

11. A fiber optic connector as set forth in claim 1 wherein:

each set of rods includes only three rods.

12. A fiber optic connector as set forth in claim 1 wherein:

each set of rods includes more than three rods.

13. A fiber optic connector as set forth in claim 1 wherein:

said groove has a transverse cross-section of a truncated equilateral triangle.

14. A fiber optic connector as set forth in claim 1 wherein:

each set of rods includes a sufficient number of rods to define a plurality of said interstitial spaces.

15. A fiber optic connector as set forth in claim 1 including:

an optical fiber in the interstitial space in each said set of rods; and each said fiber having a mating end coplanar with the mating end face of its respective set of rods.

16. A fiber optic connector as set forth in claim 17 wherein:

said rods of each set are joined to its respective fiber.

17. A fiber optic connector for coupling a pair of single optical fibers comprising:

a base plate having a V-groove in the upper surface thereof, said groove having a transverse cross-section of an equilateral triangle;

two sets of three equal diameter cylindrical rods lying lengthwise in said groove, each said set of rods having adjacent circumferential surfaces providing an interstitial space between said rods for receiving an optical fiber;

the region of said groove in which said sets of rods lie being continuous;

all the rods of each said set of rods having front ends lying in a common plane lying transverse to the longitudinal axes of said rods providing a mating end face;

said mating end faces of said sets of rods substantially abutting each other in said groove;

compression plate means mountable over said surface for arranging said rods of each set so that their centers are disposed at the vertices of the same equilateral triangle whereby fibers in said interstitial spaces will become precisely laterally aligned; and said sets of rods being removably mounted in said groove and being unattached to said compression plate means.

18. A fiber optic connector for coupling a pair of single optical fibers comprising:

a base plate having a V-groove in the upper surface thereof, said groove having a transverse cross-section of an equilateral triangle;

two sets of three equal diameter cylindrical rods lying lengthwise in said groove, each said set of rods having adjacent circumferential surfaces providing an interstitial space between said rods for receiving an optical fiber;

the region of said groove in which said sets of rods lie being continuous;

all the rods of each said set of rods having front ends lying in a common plane lying transverse to the longitudinal axes of said rods providing a mating end face;

said mating end faces of said sets of rods substantially abutting each other in said groove;

the upper surfaces of the two upper rods of each said set in said groove being above said upper surface of said base plate;

compression plate means mountable flush on said upper surface of said base plate, either said base plate and compression plate means, or said rods, or both, being of a deformable material whereby mounting said compression plate means flush on said upper surface of said base plate causes said fibers in said interstitial spaces to become precisely laterally aligned; and said sets of rods being removably mounted in said groove and being unattached to said compression plate means.

19. A fiber optic connector of coupling a pair of single optical fibers comprising:

a base plate having a groove in the upper surface thereof, said groove having two sides intersecting at an angle of 60° below said surface and extending to said surface;

two sets of three equal diameter cylindrical rods lying lengthwise in said groove;

the region of said groove in which said sets of rods lie being continuous;

all the rods of each said set of rods having front ends lying in a common plane lying transverse to the longitudinal axes of said rods providing a mating end face;

said mating end faces of said sets of rods substantially abutting each other in said groove;

a single compression plate on said base plate having a flat lower surface extending entirely over said region of said groove defining with said sides of said groove a closed channel of equilateral triangle cross-section, said compression plate engaging said two sets of rods for applying a uniform pressure to said sets of rods;

said rods of each set being dimensioned to engage each other and each rod engaging two sides of said channel; and said rods of each set providing an interstitial space therebetween for receiving an optical fiber.

20. An optical fiber termination comprising:

three equal diameter flexible cylindrical rods extending parallel to each other in closely adjacent, but not necessarily engaging, relationship defining therebetween an interstitial space;

a base element joining the rear ends of said rods having an opening therein aligned with said space;

a light transmitting optical fiber extending lengthwise through said opening into said space;

said rods being movable laterally relative to each other so that adjacent circumferential surfaces on said rods may engage each other; and all said rods and said fiber terminating in a generally coplanar mating end face which is perpendicular to the longitudinal axis of said fiber.

21. A single fiber contact comprising:
at least three equal diameter, flexible, cylindrical rods extending parallel to each other in closely adjacent, but not necessarily engaging, relationship defining therebetween at least one interstitial space;
a base element integrally joined to the rear ends of said rods; and
an opening in said base element aligned with said space and dimensioned to receive an optical fiber therethrough.

22. A single fiber contact as set forth in claim 21 wherein:
said rods have flat front faces lying in substantially a common plane perpendicular to the axis of said rods.

23. An optical fiber flat cable comprising:
an elongated, generally flat, flexible insulative member having a plurality of single optical fibers embedded therein and extending lengthwise of said member in generally parallel, spaced relationship;
the ends of said fibers extending beyond one end of said member;
a set of three equal diameter cylindrical rods carried by said member and surrounding each said fiber end, said rods of each set being movable laterally relative to each other and dimensioned so that adjacent circumferential surfaces on said rods may engage each other; and
all said rods of each set and corresponding fiber terminating in a substantially coplanar mating end face which is generally perpendicular to the longitudinal axis of said fiber.

24. An optical fiber flat cable as set forth in claim 23 wherein:
said rods are flexible.

25. An optical fiber flat cable as set forth in claim 23 including:
a flexible sleeve surrounding each set of rods.

26. An optical fiber flat cable as set forth in claim 23 including:
a bandoller mounted on said insulative member adjacent to said one end thereof; and
said sets of rods are joined to said bandoller.

27. An optical fiber flat cable as set forth in claim 23 wherein:
said rods of each set are joined together to form a unitary contact.

28. An optical fiber flat cable as set forth in claim 23 wherein:
said insulative member contains at least one hole therein for locating said member in a connector.

29. A fiber optic connector for a pair of flat cables each having a plurality of parallel, spaced optical fibers thereon each terminated by a three-rod contact comprising:
a base plate having opposite ends and sides;
a plurality of parallel grooves in the upper surface of said base plate extending between said ends of said base plate, said grooves being spaced apart a distance corresponding to the spacing of said fibers on said flat cable;
each groove having an intermediate fiber contact receiving area between said ends of said base plate, each said area having a transverse cross-section of an equilateral triangle;
a compression plate pivotally connected to one side of said base plate and having a flat surface overlying said intermediate areas of said grooves when said compression plate is pivoted over said base plate; and
cable locating means adjacent to said ends of said base plate for locating said flat cables in said connector with the respective contacts thereof in axial abutting relationship.

30. A fiber optic connector as set forth in claim 29 including:
latch means on said plates for releasably holding said compression plate flush against said upper surface of said base plate.

31. A fiber optic connector as set forth in claim 29 wherein:
the cross-section of each said groove between said intermediate area thereof and said ends of said base plate is curved.

32. A fiber optic connector as set forth in claim 29 wherein:
said plates each have windows therein on opposite sides of said contact receiving areas of said grooves.

33. A fiber optic connector for coupling single optical fibers comprising:
a pair of like-sets of at least three, generally parallel rods, each said set of rods having adjacent like-shaped cylindrical surfaces providing at least one tricuspid interstitial space between said rods for receiving an optical fiber;
each said set of rods including a base element joined to said rods;
said base element having an opening therein aligned with each said interstitial space between said rods and being dimensioned to receive a fiber therethrough;
all the rods of each said set of rods having front ends lying in a common plane lying transverse to the longitudinal axes of said rods providing a mating end face;
said mating end faces of said sets of rods substantially abutting each other; and
means surrounding said rods for exerting a uniform radially inwardly directed compressive force urging said rods of each set inwardly to cause said adjacent cylindrical surfaces thereof to engage each other so that the centers of any three contiguous rods of each set are disposed at the vertices of an equilateral triangle, whereby fibers in corresponding interstitial spaces in said sets of rods will become precisely laterally aligned.

34. A fiber optic connector as set forth in claim 33 wherein:
each said set of rods comprises three cylindrical rods.

35. A fiber optic connector as set forth in claim 33 wherein:
said rods are flexible.

36. A fiber optic connector as set forth in claim 33 wherein:
said rods are of a deformable material.

37. A single fiber contact comprising:
a body having a front and a rear;
at least three generally parallel, laterally spaced, flexible posts extending forwardly from said front of said body;

said posts having adjacent like-shaped cylindrical surfaces thereon providing therebetween at least one interstitial space;

a bore in said body aligned with said space and extending from said front to said rear thereof, said bore being dimensioned to receive an optical fiber therein; and said posts being sufficiently flexible to deflect inwardly for said cylindrical surfaces to engage each other and a fiber in said space upon application of an inwardly directed compressive force applied to said posts.

38. A single fiber contact as set forth in claim 37 wherein:
said posts are resilient.

39. A single fiber contact as set forth in claim 37 wherein:
said posts are equal diameter cylindrical rods.

40. A single fiber contact as set forth in claim 37 wherein:
said posts are of a slightly deformable material.

41. An optical fiber termination comprising:
a support body having a front and a rear;
a plurality of closely positioned fiber alignment elements mounted on the front of said body and having adjacent like-shaped circular surfaces defining a cuspid-shaped interstitial space therebetween, said alignment elements being individually movable relative to each other;
said elements having a front mating end;
a bore in said body aligned with said space and extending from said front to said rear thereof; and
a single optical fiber inserted into said bore from said rear of said body and extending forwardly into said space to a position closely adjacent to said front mating end of said elements.

42. An optical fiber termination as set forth in claim 41 wherein:
said alignment elements are equal diameter flexible cylindrical rods.

43. An optical fiber termination comprising:
a support body having a front and a rear;
at least three closely positioned fiber alignment elements fixedly mounted on the front of said body and having adjacent like-shaped circular surface defining a cuspid-shaped interstitial space therebetween;
said elements having a front mating end;
a bore in said body aligned with said space and extending from said front to said rear thereof; and
a single optical fiber inserted into said bore from said rear of said body and extending forwardly into said space to a position closely adjacent to said front mating end of said elements.

44. A fiber optic connector for coupling single optical fibers comprising:
a pair of fiber optic contacts;
each contact comprising a support body having a front and a rear, at least three closely positioned fiber alignment elements mounted on the front of said body and having adjacent like-shaped circular surfaces defining a cuspid-shaped interstitial space therebetween, said elements having a front mating end, a bore in said body aligned with said space and extending from said front to said rear, said bore being dimensioned to slidably receive a single optical fiber cable therein from the rear of said body the optical fiber of which is adapted to extend into said space to a position closely adjacent to said front mating end of said elements; and means axially aligning said contacts with said front mating ends of said elements of said contacts substantially abutting each other, whereby optical fibers in the respective interstitial spaces in said contacts will become precisely laterally aligned.

45. A fiber optic connector for coupling a pair of single optical fibers comprising:
a base plate having a groove in the upper surface thereof, said groove including a pair of planar sides that intersect below said surface at an angle of 60° and extend to said surface;
a pair of like-sets of equal diameter, flexible cylindrical rods lying lengthwise in said groove, each said set of rods having adjacent circumferential surfaces providing at least one interstitial space between said rods for receiving an optical fiber;
each said set of rods including a base element joined to said rods;
said base element having an opening therein aligned with each said interstitial space between said rods and being dimensioned to receive a fiber therethrough;
the region of said groove in which said sets of rods lie being continuous;
all the rods of each said set of rods having front ends lying in a common plane lying transverse to the longitudinal axes of said rods providing a mating end face;
said mating end faces of said sets of rods substantially abutting each other in said groove; and
compression plate means mountable over said surface for arranging said rods of each set in said groove in identical patterns wherein the centers of any three contiguous rods of each set are disposed at the vertices of an equilateral triangle, whereby fibers in corresponding interstitial spaces in said sets of rods will become precisely laterally aligned.

46. A fiber optic connector for coupling a pair of single optical fibers comprising:
a base plate having a groove in the upper surface thereof, said groove including a pair of planar sides that intersect below said surface at an angle of 60° and extend to said surface;
a pair of like-sets of equal diameter cylindrical rods lying lengthwise in said groove, each said set of rods having adjacent circumferential surfaces providing at least one interstitial space between said rods for receiving an optical fiber;
the region of said groove in which said sets of rods lie being continuous;
all the rods of each said set of rods having front ends lying in a common plane lying transverse to the longitudinal axes of said rods providing a mating end face;
said mating end faces of said sets of rods substantially abutting each other in said groove;
compression plate means mountable over said surface for arranging said rods of each set in said groove in identical patterns wherein the centers of any three contiguous rods of each set are disposed at the vertices of an equilateral triangle, whereby fibers in corresponding interstitial spaces in said sets of rods will become precisely laterally aligned; and
said compression plate means comprising a single plate having a flat lower surface extending entirely over said groove engaging said two sets of rods for applying a uniform pressure to said sets of rods.

* * * * *

UNITED STATES PATENT OFFICE
CERTIFICATE OF CORRECTION

PATENT NO. : 4,201,444

DATED : May 6, 1980

INVENTOR(S) : R. L. McCartney, B. K. Arnold and V. C. Hogan

It is certified that error appears in the above-identified patent and that said Letters Patent are hereby corrected as shown below:

On the cover page containing the ABSTRACT, first column, line [63], "May 26, 1976" should read -- April 26, 1976 --.

Signed and Sealed this

Twenty-second Day of May 1984

[SEAL]

Attest:

GERALD J. MOSSINGHOFF

Attesting Officer

Commissioner of Patents and Trademarks